(12) United States Patent
Woerpel et al.

(10) Patent No.: US 7,953,554 B2
(45) Date of Patent: *May 31, 2011

(54) SIGNAL THRESHOLDING APPARATUS, SYSTEMS, AND METHODS

(75) Inventors: J. Craig Woerpel, Katy, TX (US); Bruce E. Cornish, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 275 days.

This patent is subject to a terminal disclaimer.

(21) Appl. No.: 12/186,100

(22) Filed: Aug. 5, 2008

(65) Prior Publication Data

US 2009/0157318 A1  Jun. 18, 2009

Related U.S. Application Data

(63) Continuation of application No. 11/018,564, filed on Dec. 21, 2004, now Pat. No. 7,418,348.

(51) Int. Cl.
*G01V 1/40* (2006.01)
*G01V 1/00* (2006.01)

(52) U.S. Cl. .............................. 702/9; 367/26
(58) Field of Classification Search ............... 702/9, 1–2, 702/6, 11, 14, 17–18, 33, 39, 81, 84, 127, 702/142–143, 147, 179, 182–183, 189–191, 702/193–194, 198–199; 367/14, 26–31, 367/38, 47, 73, 81; 181/102–103, 106–107, 181/113, 122
See application file for complete search history.

(56) References Cited

U.S. PATENT DOCUMENTS

| 4,210,965 | A | 7/1980 | Ingram |
| 4,349,896 | A | 9/1982 | Hall, Jr. |
| 4,446,540 | A | 5/1984 | Zimmer |
| 4,562,556 | A | 12/1985 | Ingram et al. |
| 4,658,383 | A | 4/1987 | Zimmer |
| 4,930,109 | A | 5/1990 | Kyle |
| 5,058,078 | A | 10/1991 | Eyl et al. |
| 6,678,616 | B1 | 1/2004 | Winkler et al. |
| 6,868,038 | B2 | 3/2005 | Leaney |
| 7,418,348 | B2 | 8/2008 | Woerpel et al. |
| 2006/0136133 | A1 | 6/2006 | Woerpel et al. |

OTHER PUBLICATIONS

"U.S. Appl. No. 11/018,564, Amendment and Response filed May 9, 2006 to Non-Final Office Action mailed Jan. 10, 2006", 15 pgs.
"U.S. Appl. No. 11/018,564, Amendment and Response filed Jun. 4, 2007 to Non-Final Office Action mailed Feb. 5, 2007", 15 pgs.
"U.S. Appl. No. 11/018,564, Amendment and Response filed Nov. 17, 2006 to Non-Final Office Action mailed Jul. 24, 2006", 14 pgs.

(Continued)

*Primary Examiner* — Mohamed Charioui
*Assistant Examiner* — Toan M Le
(74) *Attorney, Agent, or Firm* — Schwegman, Lundberg & Woessner, P.A.

(57) ABSTRACT

In some embodiments, an apparatus and a system, as well as a method and an article, may include selecting a plurality of signal thresholds $T(i)=i*(TMAX/N)$ for $i=2$ to $N$ comprising a positive integer greater than one. TMAX may be equal to AMAX/R, where AMAX=a maximum peak amplitude of a signal, such as an acoustic borehole signal, and R=a root-mean-square amplitude of the signal. Applying the plurality of signal thresholds $T(i)$ to the signal to determine a corresponding plurality of peak amplitudes $A(i)$ and signal travel times for selected ones of the plurality of signal thresholds $T(i)$ may also be included.

19 Claims, 5 Drawing Sheets

OTHER PUBLICATIONS

"U.S. Appl. No. 11/018,564, Amendment and Response filed Feb. 19, 2008 to Non-Final Office Action mailed Aug. 23, 2007", 12 pgs.

"U.S. Appl. No. 11/018,564, Non-Final Office Action mailed Jan. 10, 2006", 8 pgs.

"U.S. Appl. No. 11/018,564, Non-Final Office Action mailed Feb. 5, 2007", 6 pgs.

"U.S. Appl. No. 11/018,564, Non-Final Office Action mailed Jul. 24, 2006", 5 pgs.

"U.S. Appl. No. 11/018,564, Non-Final Office Action mailed Aug. 23, 2007", 6 pgs.

"U.S. Appl. No. 11/018,564, Notice of Allowance mailed Apr. 21, 2008", 6 pgs.

"U.S. Appl. No. 11/018,564, Preliminary Amendment filed Sep. 12, 2005", 12 pgs.

SIGNAL THRESHOLDING APPARATUS, SYSTEMS, AND METHODS

RELATED APPLICATION

This application is a continuation of U.S. patent application Ser. No. 11/018,564, filed Dec. 21, 2004, now U.S. Pat. No. 7,418,348, which is incorporated herein by reference in its entirety.

TECHNICAL FIELD

Various embodiments described herein relate to information processing generally, including apparatus, systems, and methods for acquiring and processing acoustic signal information.

BACKGROUND INFORMATION

An acoustic logging tool may include one or more acoustic receivers. Acoustic signals may be transmitted by a variety of acoustic sources and received at the receivers as the tool passes through a borehole. Thus, the acoustic signal from a particular source may travel through the formation adjacent the borehole to the receiver array, such that arrival times and other characteristics of the receiver response may be recorded. Received signals may include compressional waves (P-waves), shear waves (S-waves), and Stoneley waves. Received signal data may be processed to determine signal travel distance and formation characteristics, including slowness (the inverse of acoustic speed), from which pore pressure, porosity, and other formation property determinations can be made.

Traditional acoustic tools may detect acoustic signal travel times based on a selected trigger threshold. However, the usefulness of measurements obtained may be reduced due to the presence of various noise sources. Low thresholds may cause false trigger indications, and high thresholds may prevent detection of desired signals.

DETAILED DESCRIPTION

Figure 1A:
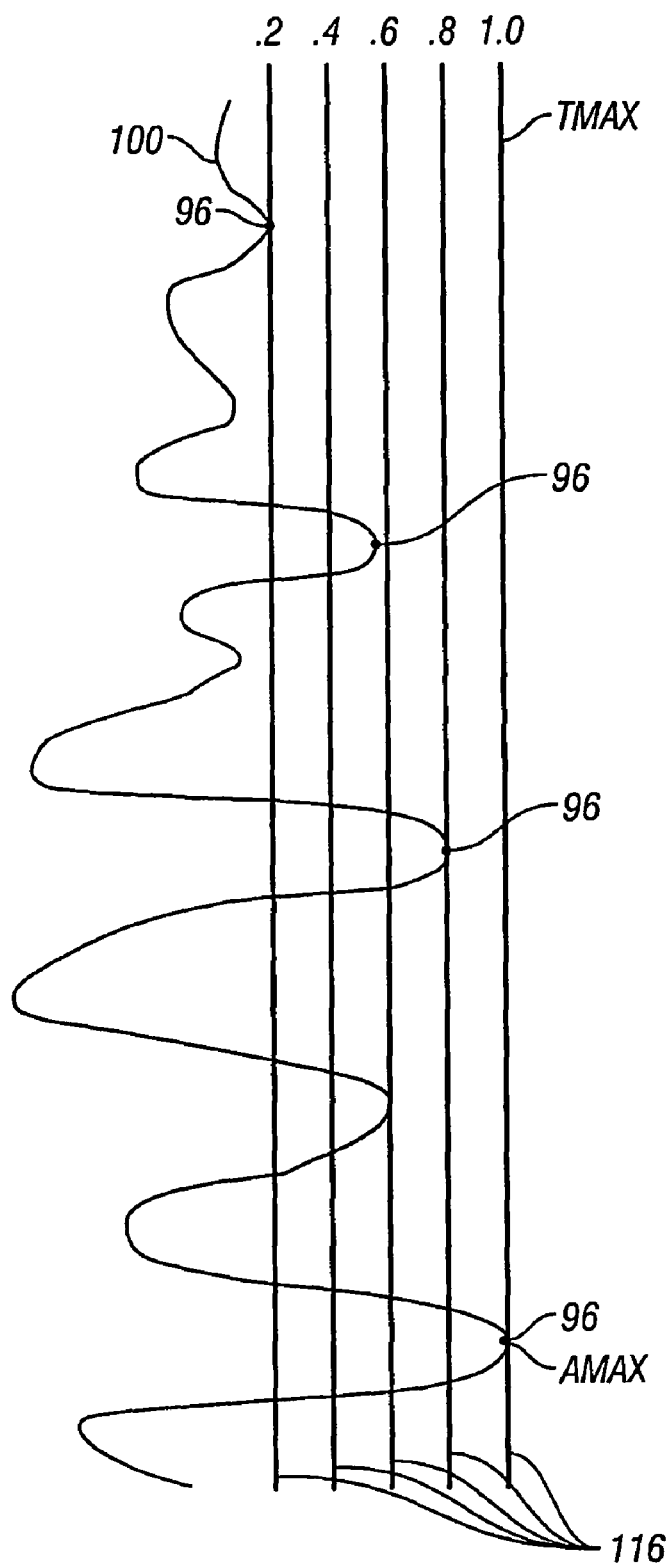
FIGS. 1A and 1B illustrate multiple picks for a single signal and a display of multiple picks for multiple signals, respectively, according to various embodiments of the invention.

Seismic While Drilling (SWD) is a technology that can be used to measure seismic velocities in the rock adjacent to a well as the well is being drilled. A seismic recording module or "tool" may be attached to the drill bit to follow the drill bit into the well. When drilling is temporarily suspended to add new segments of pipe at the surface, a seismic source near the wellhead may be triggered to send a seismic signal down through the rock to the SWD tool at the current bottom of the well. Sources may include dynamite charges, air guns, and vibroseis trucks, among others.

When the seismic signal, such as an acoustic borehole signal is received downhole, the downhole tool may operate to record the signal. A computer in the tool may use various algorithms to process the signal and obtain an indication of the signal arrival time. Since sources can be triggered at known time intervals, the travel time from the surface to each recording depth level may be calculated. For the purposes of this document, it should be noted that the travel time of an "acoustic" wave, including sound waves, may be determined using sensors that can detect the pressure, displacement, particle velocity, and/or particle acceleration of the acoustic wave.

In some circumstances, it is not practical to attach an electrical wire from the surface to the tool. In such cases, travel time data may be sent uphole by, for example, using coded pulses transmitted through drilling mud or other fluids that fill the well. Drilling may then proceed for some distance until the process is suspended to add another pipe section, during which time additional seismic measurements can be made. The true vertical depth interval between levels (e.g., pipe section lengths) divided by the true vertical interval travel time may provide an indication of interval signal velocity. The total true vertical depth divided by the total true vertical travel time may indicate an average signal velocity.

A knowledge of seismic signal travel time (and velocity) as a function of position may facilitate drilling to known targets, as well as avoiding high-pressure zones. Performing the measurements during drilling operations, rather than during oil/gas production, can avoid the necessity of shutting in the well and losing production while data are collected.

As mentioned previously, detection software using a preset trigger threshold to determine when a signal has arrived at the tool with sufficient amplitude for recording may not provide the desired results. Improper threshold levels relative to background noise may result in "false alarms", as well as a failure to detect any signal at all. In each case, accurate travel time data for the level in question may be lost.

Thus, if the threshold is too low, for example, random noise bursts arriving before the true "primary" signal may be "picked", i.e. identified as the actual signal arriving from the surface source. Such noise bursts may be due to wind, radio transmissions, or other noise that exists in the environment of a working drill rig. If the threshold is set too high, the desired signal may not have enough amplitude to exceed the trigger detection level. Instead, high amplitude waves arriving after the desired primary wave may be picked, providing grossly inaccurate travel times.

Setting thresholds using human interaction in a non-real time environment normally occurs via trial and error. Self-adjusting computer algorithms also may be used to select thresholds, but incorrectly chosen thresholds can result in detecting false signals and generating incorrect arrival times. Therefore it is advantageous to devise a mechanism whereby multiple threshold criteria are automatically determined to increase the likelihood that the data describing the correct candidate "primary" pick (i.e., correct primary wave) is among that chosen for transmission uphole.

In some embodiments, multiple thresholds over a selected range can be used as part of a mechanism to make multiple picks, perhaps increasing the probability that the true primary or "P-wave" arrival is captured while the corresponding peak point on the signal wavelet at each level is picked. In this way the travel time change from one depth level to the next may be more accurately measured. Once they are transmitted to the surface, multiple candidate picks may be interpreted by an analyst with the aid of computer software to determine which of the multiple picks (perhaps corresponding to the multiple thresholds) is in fact the true primary arrival.

Figure 1B:
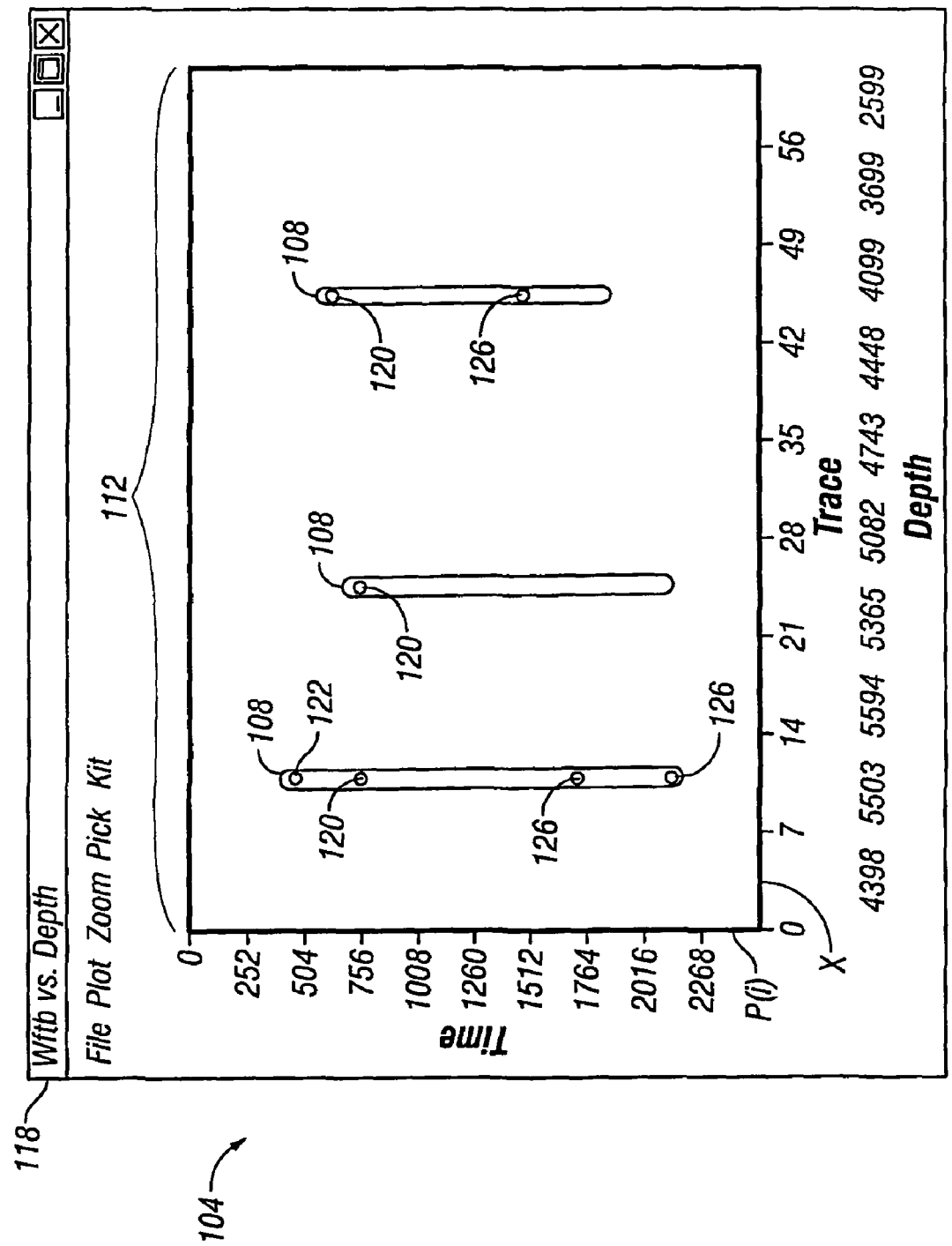

FIGS. 1A and 1B illustrate multiple picks 96 for a single signal 100 and a display 104 of the multiple picks 108 for a few of the multiple signals 112, respectively, according to various embodiments of the invention. For example, assume the maximum usable signal threshold is TMAX=AMAX/R, where AMAX is the peak amplitude of the signal 100 (e.g., a received acoustic borehole signal) and R is the root mean square (RMS) amplitude of the signal 100. Applying this maximum threshold TMAX may operate to detect the travel time of the peak amplitude AMAX as the time of the signal arrival at the receiver. To select N thresholds 116 (e.g., N=5 in FIG. 1A) for use, consider multiple thresholds as T(i)=i*(T/N) for i=1 to N, where N is a positive integer. In some embodiments, using multiple thresholds T(i) may operate to yield duplicate pick times. In some embodiments, there may be up to N different picks 96 for N thresholds.

A signal-to-noise ratio (SNR) for each pick 96 may be expressed as SNR(i)=A(i)/R, where A(i) is the amplitude of the pick 96. Since the number of picks 96 that can be sent uphole via the mud pulsing device in a cost efficient manner may be limited by time, the picks 96 selected for transmission might be limited to those having the highest SNR consistent with a particular sensor type.

At the surface, the pick times P(i) (e.g., acoustic borehole signal travel times) may be displayed versus the measured position X of the tool in the borehole on a computer screen 118. The correct pick 120 out of multiple picks 108 for each acquired signal 100 may then be manually selected so that all trace intervals give correct average velocities with respect to a seismic reference datum. Picks corresponding to noise bursts 122 (usually random) early in the trace, or picks corresponding to tube or shear waves 126 (usually spatially coherent, i.e., aligned) late in the acquired signals may be recognized and excluded more easily since the picks from all acquired signals may be displayed simultaneously. Various embodiments may be realized that operate in the manner described.

Figure 2:
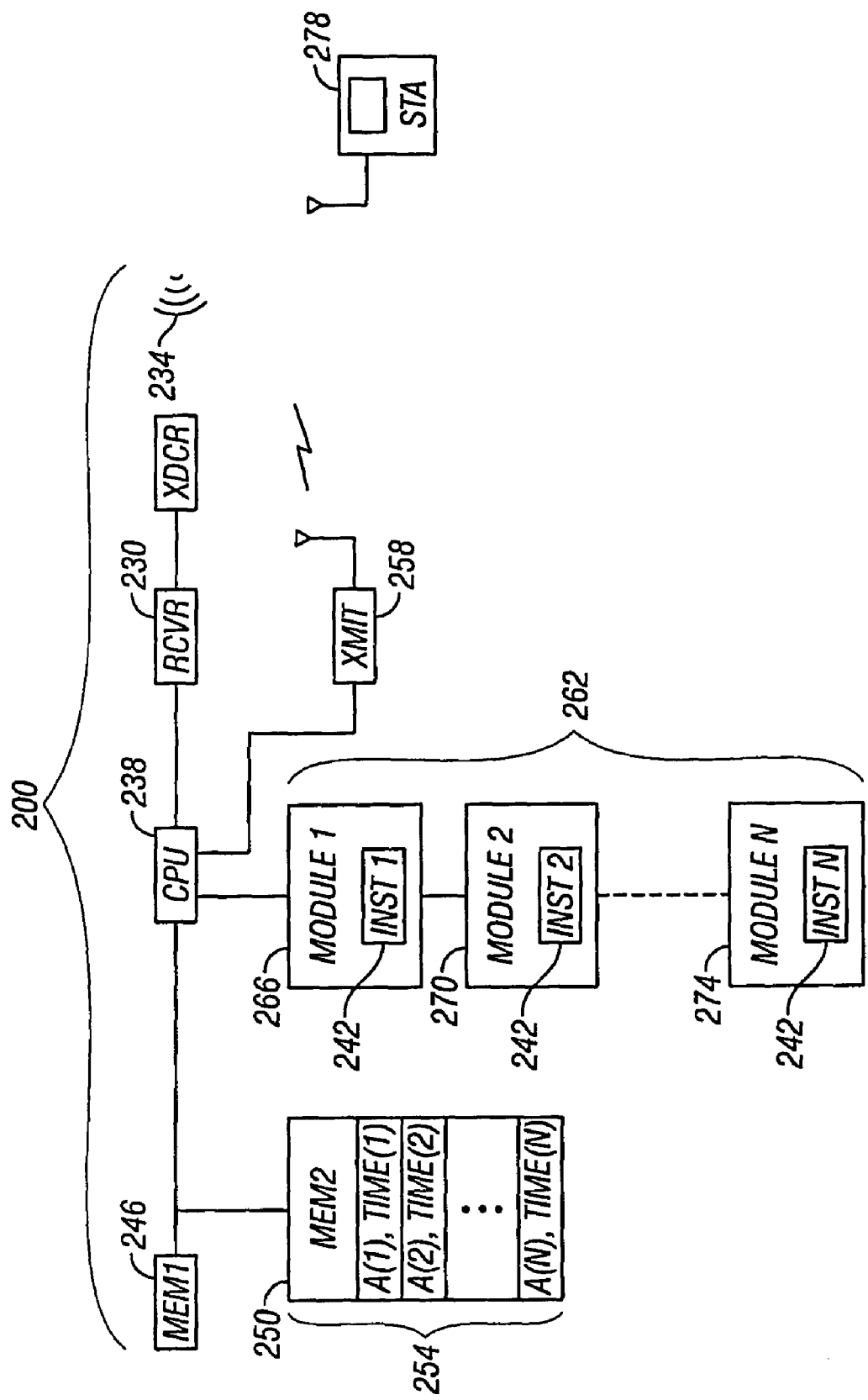
FIG. 2 is a block diagram of an apparatus according to various embodiments of the invention.

For example, FIG. 2 is a block diagram of an apparatus according to various embodiments of the invention, in which an apparatus 200 may comprise a receiver 230 to receive an acoustic borehole signal 234, a processor 238 to couple to the receiver 230, and one or more modules (e.g., MODULE1 ... MODULEN) comprising instructions 242 to select a plurality of signal thresholds T(i)=i*(TMAX/N) for i=2 to N, where N comprises a positive integer greater than one. TMAX may be equal to about AMAX/R, wherein AMAX=a maximum peak amplitude of the acoustic borehole signal and R=a root-mean-square amplitude of the acoustic borehole signal. The plurality of signal thresholds T(i) may be applied to the acoustic borehole signal to determine a corresponding plurality of peak amplitudes A(i), as well as corresponding signal travel times, for selected ones of the plurality of signal thresholds T(i). The instructions 242 may be used to direct the processor 238 to accomplish any of the activities described herein.

In some embodiments, the apparatus 200 may include a memory 246 to store selected portions of the acoustic borehole signal 234, including the entire acoustic borehole signal 234. The apparatus 200 may also include a memory 250 to store selected ones 254 of the plurality of peak amplitudes A(i) and signal travel times time(i). In some embodiments, the apparatus 200 may include a transmitter 258 to transmit the selected ones 254 of the plurality of peak amplitudes A(i) and signal travel times time(i) to a remote location 278, perhaps comprising a receiving station, including a computer workstation.

In some embodiments, the apparatus 200 may include a number of processing modules 262. For example, the apparatus 200 may include a module 266 to determine a signal-to-noise ratio SNR(i)=A(i)/R for the plurality of peak amplitudes A(i). The apparatus 200 may also include a module 270 to determine a sensor type associated with the receiver 230. The apparatus 200 may even include a multifunction module 274, such that several processing activities are carried out using a single module. For example, the module 274 may operate to: (1) select a group from the plurality of peak amplitudes A(i) according to a determined range of estimated velocities (e.g., the best estimates of anticipated velocities according to previous seismic investigations, perhaps derived from vertical seismic profile (VSP) information); (2) eliminate a group from the plurality of peak amplitudes A(i) according to a determination of interfering noise sources (e.g., determining that some of the peak amplitudes A(i) are due to tube waves, including noise propagated by the borehole; shear waves, perhaps derived from the primary wave; and random noise); (3) select a true primary wave from the plurality of peak amplitudes A(i) according to a range of estimated velocities and a determination of interfering noise sources; and (4) correlate a borehole path determined by the plurality of peak amplitudes A(i) with one or more interfaces included in a surface seismic image.

Figure 3:
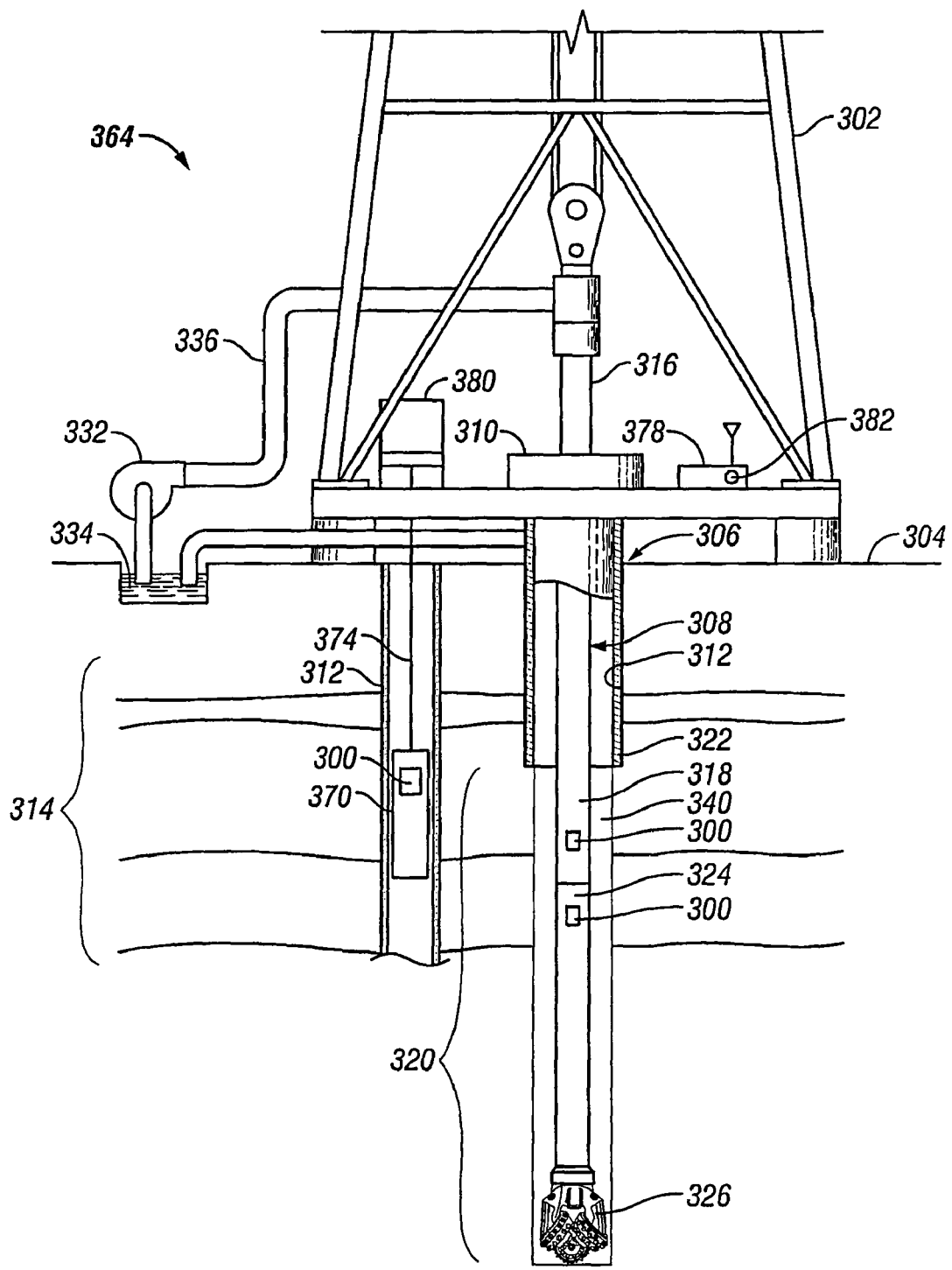
FIG. 3 is an illustration of apparatus and systems according to various embodiments of the invention.

FIG. 3 is an illustration of apparatus 300 and systems 364 according to various embodiments of the invention, which may comprise portions of a downhole tool 324 as part of a downhole drilling operation, or a tool body 370 as part of a logging operation. Thus, in some embodiments, a system 364 may form a portion of a drilling rig 302 located at a surface 304 of a well 306. The drilling rig 302 may provide support for a drill string 308. The drill string 308 may operate to penetrate a rotary table 310 for drilling a borehole 312 through subsurface formations 314. The drill string 308 may include a Kelly 316, drill pipe 318, and a bottom hole assembly 320, perhaps located at the lower portion of the drill pipe 318.

The bottom hole assembly 320 may include drill collars 322, a downhole tool 324, and a drill bit 326. The drill bit 326 may operate to create a borehole 312 by penetrating the surface 304 and subsurface formations 314. The downhole tool 324 may comprise any of a number of different types of tools including MWD (measurement while drilling) tools, LWD (logging while drilling) tools, and others.

During drilling operations, the drill string 308 (perhaps including the Kelly 316, the drill pipe 318, and the bottom hole assembly 320) may be rotated by the rotary table 310. In addition to, or alternatively, the bottom hole assembly 320 may also be rotated by a motor (e.g., a mud motor) that is located downhole. The drill collars 322 may be used to add weight to the drill bit 326. The drill collars 322 also may stiffen the bottom hole assembly 320 to allow the bottom hole assembly 320 to transfer the added weight to the drill bit 326, and in turn, assist the drill bit 326 in penetrating the surface 304 and subsurface formations 314.

During drilling operations, a mud pump 332 may pump drilling fluid (sometimes known by those of skill in the art as "drilling mud") from a mud pit 334 through a hose 336 into the drill pipe 318 and down to the drill bit 326. The drilling fluid can flow out from the drill bit 326 and be returned to the surface 304 through an annular area 340 between the drill pipe 318 and the sides of the borehole 312. The drilling fluid may then be returned to the mud pit 334, where such fluid is filtered. In some embodiments, the drilling fluid can be used to cool the drill bit 326, as well as to provide lubrication for the drill bit 326 during drilling operations. Additionally, the drilling fluid may be used to remove subsurface formation 314 cuttings created by operating the drill bit 326.

Thus, referring now to FIGS. 2 and 3, it may be seen that in some embodiments, the system 364 may include a drill collar 322, a downhole tool 324, and/or a tool body 370 to house one or more apparatus 300, similar to or identical to the apparatus 200 described above and illustrated in FIG. 2. Thus, for the purposes of this document, the term "housing" may include any one or more of a drill collar 322, a downhole tool 324, and a tool body 370. The downhole tool 324 may comprise an LWD tool and an MWD tool. The tool body 370 may comprise a wireline logging tool, for example, coupled to a logging cable 374.

In some embodiments, the system 364 may include a transmitter 380 to transmit (or initiate transmission of) the acoustic borehole signal. The transmitter 380 may comprise any number of signal sources, including dynamite charges, air guns, and vibroseis trucks, etc. as noted previously. The system 364 may also include a display 382 to display the plurality of signal travel times versus a corresponding plurality of measured depth positions (e.g., in a manner similar to or identical to that illustrated for the display 104 shown in FIG. 1. The display 382 may comprise a computer screen similar to or identical to the computer screen 118 shown in FIG. 1. When the transmitter (see element 258 in FIG. 2) in the apparatus 300 operates to transmit selected ones of the plurality of peak amplitudes A(i) and signal travel times time(i) to a remote location 378, that location may comprise a computer workstation or other device located on the drilling rig 302, or at any other desired position.

The multiple picks 96, 108; single signal 100; displays 104, 382; multiple signals 112; computer screen 118; correct pick 120; noise bursts 122; waves 126; apparatus 200, 300; receiver 230; acoustic borehole signal 234; processor 238; instructions 242; memories 246, 250; selected peak amplitudes 254; transmitter 258; remote location 278, 378; processing modules 262, 266, 270; multifunction module 274; drilling rig 302; surface 304; well 306; drill string 308; rotary table 310; borehole 312; subsurface formations 314; Kelly 316; drill pipe 318; bottom hole assembly 320; drill collars 322; downhole tool 324; drill bit 326; mud pump 332; mud pit 334; hose 336; annular area 340; system 364; tool body 370; logging cable; transmitter 380; amplitudes A(i); peak amplitude AMAX; modules MODULE1, ..., MODULEN; number of thresholds N; pick times P(i); RMS amplitude R; signal-to-noise ratio SNR(i); thresholds T(i); and measured position X may all be characterized as "modules" herein. Such modules may include hardware circuitry, and/or a processor and/or memory circuits, software program modules and objects, and/or firmware, and combinations thereof, as desired by the architect of the apparatus 200, 300 and systems 364, and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for drilling operations, and thus, various embodiments are not to be so limited. The illustrations of apparatus 200, 300 and systems 364 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as sub-components within a variety of electronic systems, such as televisions, cellular telephones, personal computers, workstations, radios, video players, vehicles, and signal processing for geothermal tools, among others. Some embodiments include a number of methods.

Figure 4:
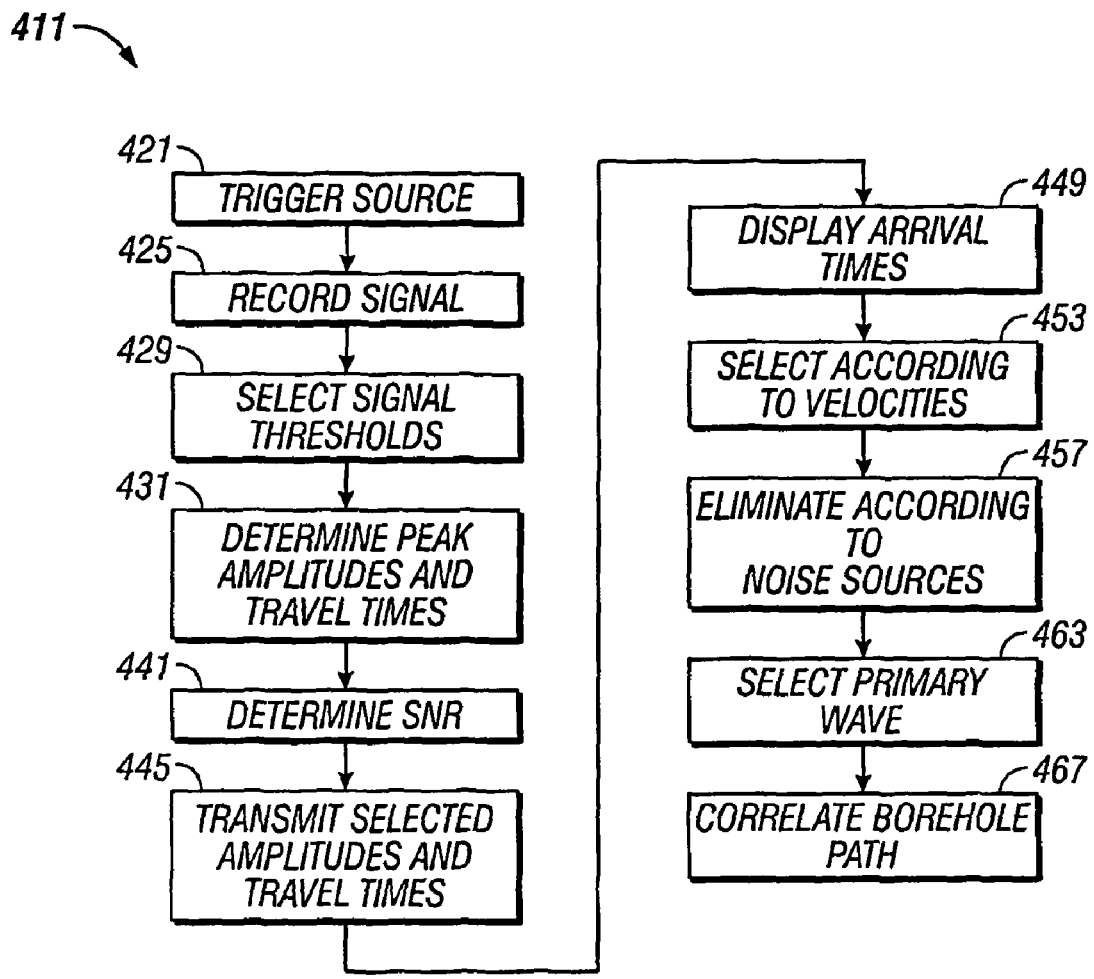
FIG. 4 is a flow chart illustrating several methods according to various embodiments of the invention.

For example, FIG. 4 is a flow chart illustrating several methods 411 according to various embodiments of the invention. In some embodiments of the invention, a method 411 may (optionally) begin at block 421 with triggering a seismic source of the acoustic borehole signal at known or detected time intervals. The method 411 may continue with recording the acoustic borehole signal, perhaps by storing selected portions of the signal, or even the entire signal, in a memory at block 425.

In some embodiments, the method 411 may include selecting a plurality of signal thresholds T(i) at block 429, where T(i) may be equal to about i*(TMAX/N) for i=2 to N (e.g., N may comprise a positive integer greater than one). TMAX may be equal to about AMAX/R, as described previously. The plurality of signal thresholds T(i) may then be applied to the acoustic borehole signal to determine a corresponding plurality of peak amplitudes A(i) and signal travel times time(i) for selected ones of the plurality of signal thresholds T(i) at block 431.

The method 411 may include determining a signal-to-noise ratio SNR(i)=A(i)/R for the plurality of peak amplitudes A(i) at block 441. The method 411 may then go on to include transmitting selected ones of the plurality of peak amplitudes A(i) and signal travel times time(i) to a remote location at block 441, perhaps according to the determined signal-to-noise ratio SNR(i). As noted previously, the signal-to-noise ratio SNR(i) may be used to determine whether the corresponding peak amplitude A(i) is consistent with a selected sensor type, such as a geophones or accelerometer, among others. Thus, the signal-to-noise ratio SNR(i) criteria may vary between sensor types due to the intrinsic characteristics of each type.

In some embodiments, the method 411 may include displaying the plurality of signal travel times versus a corresponding plurality of measured depth positions (e.g., the depth measured to a particular receiver along the borehole, which may not be the same as the estimated true depth, depending on the orientation of the drill string and the surface). The method 411 may also include selecting a group from the plurality of peak amplitudes A(i) according to a determined range of estimated velocities, as described previously, at block 453.

In some embodiments, the method 411 may include several mechanisms for refining the selection of peak amplitudes that are transmitted by the apparatus, and for discriminating the received amplitudes from false information. For example, the method 411 may include eliminating a group from the plurality of peak amplitudes A(i) according to a determination of interfering noise sources at block 457. The method 411 may also include selecting a true primary wave from the plurality of peak amplitudes A(i) according to a range of estimated velocities and a determination of interfering noise sources at block 463. The method 411 may (optionally) conclude at block 467 by correlating a borehole path determined by the plurality of peak amplitudes A(i) with at least one interface included in a surface seismic image.

It should be noted that the methods described herein do not have to be executed in the order described, or in any particular order. Moreover, various activities described with respect to the methods identified herein can be executed in iterative, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 5:
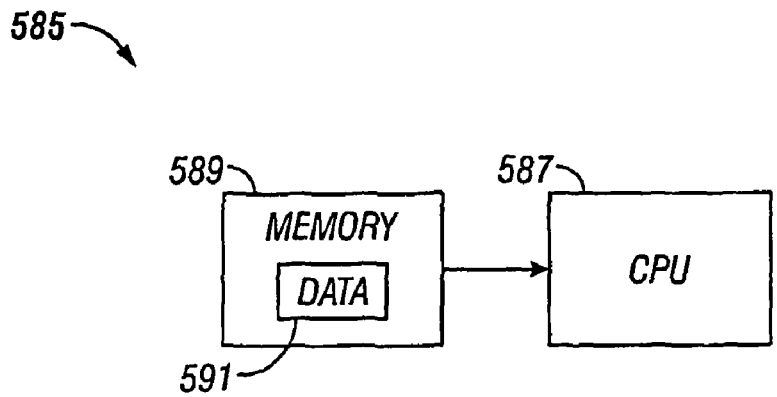
FIG. 5 is a block diagram of an article according to various embodiments of the invention.

For example, FIG. 5 is a block diagram of an article 585 according to various embodiments, such as a computer, a memory system, a magnetic or optical disk, some other storage device, and/or any type of electronic device or system. The article 585 may include a processor 587 coupled to a machine-accessible medium such as a memory 589 (e.g., removable storage media, as well as any memory including an electrical, optical, or electromagnetic conductor) having associated information 591 (e.g., computer program instructions and/or data), which when accessed, results in a machine (e.g., the processor 587) performing such actions as selecting a plurality of signal thresholds $T(i)=i*(TMAX/N)$ for i=2 to N, where N comprises a positive integer greater than one. TMAX may be equal to about AMAX/R, where AMAX equals a maximum peak amplitude of an acoustic borehole signal, and R equals a root-mean-square amplitude of the acoustic borehole signal. Other activities may include applying the plurality of signal thresholds to the acoustic borehole signal to determine a corresponding plurality of peak amplitudes A(i) and signal travel times for selected ones of the plurality of signal thresholds T(i).

Further activities may include, for example, triggering a seismic source of the acoustic borehole signal at known time intervals, recording the acoustic borehole signal, transmitting selected ones of the plurality of peak amplitudes A(i) and signal travel times to a remote location, determining a signal-to-noise ratio $SNR(i)=A(i)/R$ for the plurality of peak amplitudes A(i), and then transmitting selected ones of the plurality of peak amplitudes A(i) to a remote location according to the signal-to-noise ratio.

Other activities may include displaying the plurality of signal travel times versus a corresponding plurality of measured depth positions, selecting a group from the plurality of peak amplitudes A(i) according to a determined range of estimated velocities, eliminating a group from the plurality of peak amplitudes A(i) according to a determination of interfering noise sources, selecting a true primary wave from the plurality of peak amplitudes A(i) after according to a range of estimated velocities and a determination of the interfering noise sources, as well as correlating a borehole path determined by the plurality of peak amplitudes A(i) with at least one interface included in a surface seismic image.

Using the apparatus, systems, and methods disclosed herein may permit using multiple detection threshold criteria to obtain multiple candidate picks, which may in turn operate to reduce the risk of losing significant data at a particular recording level, or even for an entire survey. With adequate data, targets identified on surface seismic images may be more easily correlated with the well track. In addition, conventional VSP processing may be rendered more efficient, since a range of possible thresholds can be generated automatically, rather than via trial and error.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
    a receiver to receive an acoustic borehole signal;
    a processor to couple to the receiver;
    a module comprising instructions to direct the processor to select a plurality of signal thresholds, and to apply the plurality of signal thresholds to the acoustic borehole signal to determine a corresponding plurality of peak amplitudes and signal travel times for selected ones of the plurality of signal thresholds based on a signal-to-noise ratio for the plurality of signal thresholds.

2. The apparatus of claim 1, further comprising:
a module to determine the signal-to-noise ratio as approximately equal to a quotient of a peak amplitude selected from the plurality of peak amplitudes and a root-mean-square amplitude of the acoustic borehole signal for the plurality of peak amplitudes.

3. The apparatus of claim 1, further comprising:
a module to determine a sensor type associated with the receiver.

4. A system, comprising:
a housing selected from one of a drill collar, a downhole tool, or a tool body; and
a receiver to receive an acoustic borehole signal;
a processor included in the housing to couple to the receiver; and
a module comprising instructions to direct the processor to select a plurality of signal thresholds, and to apply the plurality of signal thresholds to the acoustic borehole signal to determine a corresponding plurality of peak amplitudes and signal travel times for selected ones of the plurality of signal thresholds based on a signal-to-noise ratio for the plurality of signal thresholds.

5. The system of claim 4, further comprising:
a display to display the plurality of signal travel times versus a corresponding plurality of measured depth positions.

6. The system of claim 4, further comprising:
a module to select a group from the plurality of peak amplitudes according to a determined range of estimated velocities.

7. The system of claim 4, further comprising:
a module to eliminate a group from the plurality of peak amplitudes according to a determination of interfering noise sources.

8. A method, comprising:
selecting, using one or more hardware modules, a plurality of signal thresholds based on a maximum peak amplitude of an acoustic borehole signal acquired by a signal reception element located in a borehole, and a root-mean-square amplitude of the acoustic borehole signal; and
applying a signal-to-noise ratio of the plurality of signal thresholds, using one or more processors, to the acoustic borehole signal to determine a corresponding plurality of peak amplitudes and signal travel times for selected ones of the plurality of signal thresholds to determine a seismic velocity of a formation around the borehole.

9. The method of claim 8, further comprising:
determining the signal-to-noise ratio as approximately equal to a quotient of a peak amplitude selected from the plurality of peak amplitudes and the root-mean-square amplitude of the acoustic borehole signal for the plurality of peak amplitudes.

10. The method of claim 8, further comprising:
transmitting selected ones of the plurality of peak amplitudes to a remote location according to the signal-to-noise ratio.

11. The method of claim 8, further comprising:
displaying the plurality of signal travel times versus a corresponding plurality of measured depth positions.

12. The method of claim 8, further comprising:
selecting a true primary wave from the plurality of peak amplitudes according to a range of estimated velocities and a determination of interfering noise sources.

13. The method of claim 8, further comprising:
correlating a borehole path determined by the plurality of peak amplitudes with at least one interface included in a surface seismic image.

14. An article including a non-transitory computer medium having computer instructions stored thereon, wherein the instructions, when executed, result in a computer performing:
selecting a plurality of signal thresholds based on a maximum peak amplitude of an acoustic borehole signal and a root-mean-square amplitude of the acoustic borehole signal; and
applying a signal-to-noise ratio of the plurality of signal thresholds to the acoustic borehole signal to determine a corresponding plurality of peak amplitudes and signal travel times for selected ones of the plurality of signal thresholds to determine a seismic velocity of a formation around the borehole.

15. The article of claim 14, wherein the instructions, when executed, result in the computer performing:
triggering a seismic source of the acoustic borehole signal at known time intervals.

16. The article of claim 14, wherein the instructions, when executed, result in the computer performing:
recording the acoustic borehole signal.

17. The article of claim 14, wherein the instructions, when executed, result in the computer performing:
transmitting selected ones of the plurality of peak amplitudes and signal travel times to a remote location.

18. The article of claim 14, wherein the instructions, when executed, result in the computer performing:
determining a signal-to-noise ratio approximately equal to a quotient of a peak amplitude selected from the plurality of peak amplitudes and a root-mean-square amplitude of the acoustic borehole signal for the plurality of peak amplitudes.

19. The article of claim 14, wherein the instructions, when executed, result in the computer performing:
transmitting selected ones of the plurality of peak amplitudes to a remote location according to the signal-to-noise ratio consistent with a selected sensor type.

* * * * *